(12) United States Patent
Schep et al.

(10) Patent No.: US 7,385,908 B2
(45) Date of Patent: *Jun. 10, 2008

(54) RECORD CARRIER INCLUDING A SERVO TRACK HAVING FIRST AND SECOND MODULATED PARTS REPRESENTING A DATA TYPE AND A WORD SYNC TYPE, RESPECTIVELY, AND AN APPARATUS FOR SCANNING THE RECORD CARRIER

(75) Inventors: Cornelis Marinus Schep, Eindhoven (NL); Aalbert Stek, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 393 days.

This patent is subject to a terminal disclaimer.

(21) Appl. No.: 11/121,752

(22) Filed: May 4, 2005

(65) Prior Publication Data

US 2005/0254409 A1    Nov. 17, 2005

Related U.S. Application Data

(63) Continuation of application No. 10/268,445, filed on Oct. 10, 2002, now Pat. No. 6,952,381.

(30) Foreign Application Priority Data

Oct. 15, 2001    (EP)    ................................ 01203881

(51) Int. Cl.
G11B 7/00    (2006.01)

(52) U.S. Cl. .................................. 369/275.3; 369/47.27

(58) Field of Classification Search ............. 369/275.3, 369/47.1, 47.27, 47.28, 44.13, 275.4
See application file for complete search history.

(56) References Cited

U.S. PATENT DOCUMENTS

| 4,067,044 | A | 1/1978 | Maeda et al. |
| 4,392,219 | A | 7/1983 | Yokozawa et al. |
| 5,023,856 | A | 6/1991 | Raaymakers et al. |
| 6,538,982 | B1 | 3/2003 | Van Vlerken et al. |
| 6,765,861 | B2 | 7/2004 | Van Vlerken et al. |
| 2003/0128640 | A1 | 7/2003 | Schep et al. |
| 2003/0174603 | A1 | 9/2003 | Schep et al. |

FOREIGN PATENT DOCUMENTS

WO    WO 00/43996    7/2000

*Primary Examiner*—Nabil Hindi

(57) ABSTRACT

A record carrier has a servo track (4) indicating an information track (9) intended for recording information blocks. The servo track (4) has a periodic variation of a physical parameter at a predetermined frequency and modulated parts for encoding position information at regular intervals. The modulated parts start with a bit sync element and are of a data type having a data bit element, or of a word sync type having a word sync element. The word sync element and the data bit element are modulated according to a same predetermined type of modulation of the periodic variation. The effective strength of a modulated element is the number of periodic variations that are substantially different and available for detection of that element. The effective strength of the word sync element and of the data bit element are equal.

14 Claims, 5 Drawing Sheets

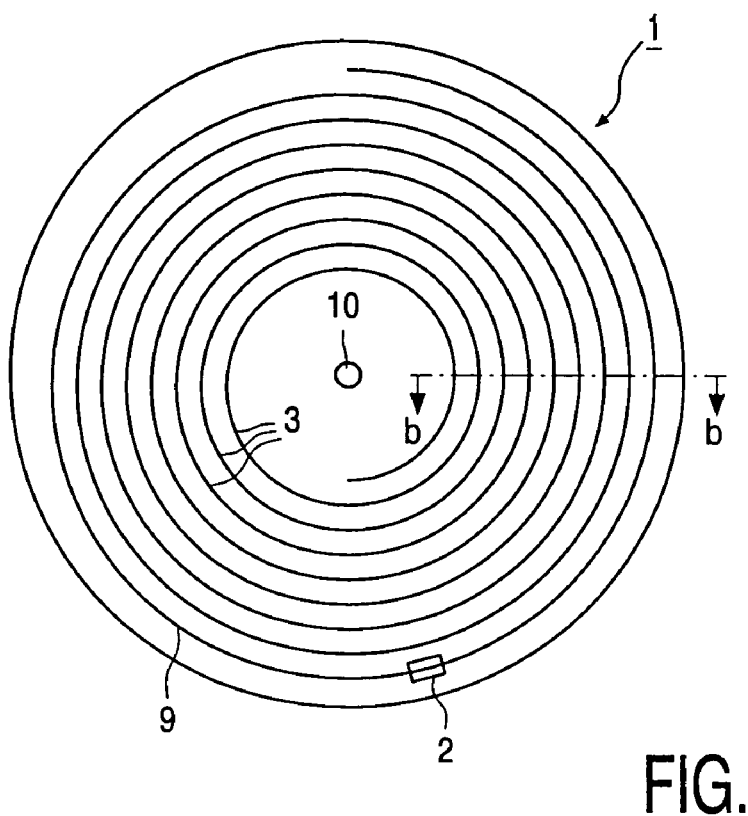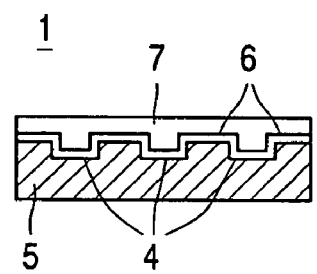
FIG. 1b
FIG. 1a
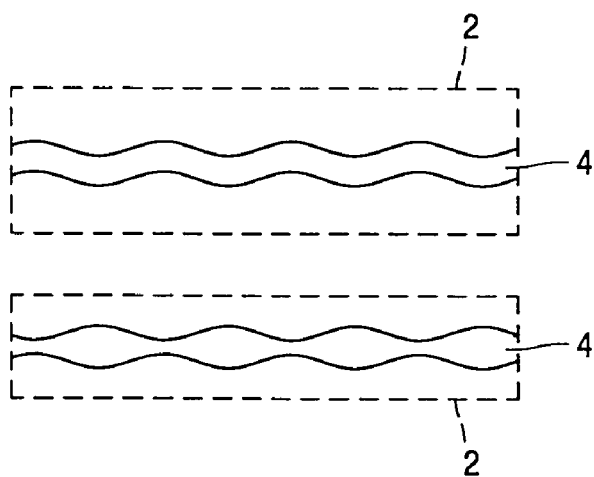
FIG. 1c
FIG. 1d

FIG.4

RECORD CARRIER INCLUDING A SERVO TRACK HAVING FIRST AND SECOND MODULATED PARTS REPRESENTING A DATA TYPE AND A WORD SYNC TYPE, RESPECTIVELY, AND AN APPARATUS FOR SCANNING THE RECORD CARRIER

CROSS-REFERENCE TO RELATED APPLICATIONS

This is a continuation application of U.S. patent application Ser. No. 10/268,445, filed Oct. 10, 2002, now U.S. Pat. No. 6,952,381, the contents of which is incorporated herein by reference.

BACKGROUND OF THE INVENTION

1. Field of the Invention

The invention relates to a record carrier comprising a servo track indicating an information track intended for recording information blocks represented by marks, said servo track having a periodic variation of a physical parameter at a predetermined frequency and modulated parts for encoding position information at regular intervals, a first type of modulated parts starting with a bit sync element and being of a data type having a data bit element, and a second type of modulated parts starting with a bit sync element and being of a word sync type having a word sync element, the word sync element and the data bit element being modulated according to a same predetermined type of modulation of the periodic variation.

The invention further relates to a recording and/or playback device comprising means for writing and/or reading information blocks in an information track on a record carrier having a servo track indicating the information track, said device comprising means for scanning the servo track and demodulation means for retrieving position information from a signal generated by a variation of a physical parameter of the servo track at a predetermined frequency, said servo track having modulated parts for encoding position information at regular intervals, a first type of modulated parts starting with a bit sync element and being of a data type having a data bit element, and a second type of modulated parts starting with a bit sync element and being of a word sync type having a word sync element, the word sync element and the data bit element being modulated according to a same predetermined type of modulation of the periodic variation.

The invention further relates to a method for manufacturing the record carrier.

2. Description of the Related Art

A record carrier and device for reading and/or writing information are known from International Patent Application No. WO 00/43996, corresponding to U.S. Pat. Nos. 6,538,982 and 6,765,861 (PHN 17323). The information to be recorded is encoded into an information signal which includes address codes and is subdivided in accordance with the address codes into information blocks. The record carrier is of a recordable type and has a servo track, usually called pre-groove, for causing servo signals to be generated when scanning the track. A physical parameter, e.g., the radial position, of the pre-groove periodically varies at a predetermined frequency constituting a so-called wobble. During the scanning of the track, this wobble leads to a variation of the radial tracking servo signals and a wobble signal can be generated. The wobble is modulated according to a type of modulation using phase modulation for encoding position information. The phase modulation or frequency modulation used for encoding digital position information is selected to minimally disturb the component of the predetermined frequency in the wobble signal, because that component is used to control the recording speed. Hence, a majority of the periodic variations needs to be non-modulated, i.e., having the zero crossings not shifted from the nominal positions. During recording, the position information is retrieved from the wobble signal and is used for positioning the information blocks by keeping a predefined relation between the address codes in the information blocks and the position information. The addresses are encoded in modulated parts of the wobble starting with a bit sync element followed by either a word sync element or a data bit element.

A problem of the known system is that detection of the word sync element is not reliable.

SUMMARY OF THE INVENTION

It is an object of the invention to provide a record carrier and device in which the synchronization is more reliable.

According to the invention, a record carrier as defined in the opening paragraph, is characterized in that the effective strength of the word sync element and of the data bit element are equal, the effective strength being the number of periodic variations that are substantially different and available for detection of the corresponding element. Further, the recording and/or playback device, as described in the opening paragraph, is characterized in that the demodulation means comprises means for detecting the type of the modulated parts across a same effective strength by detecting the word sync element or the data bit element, the effective strength being the number of periodic variations that are substantially different for the corresponding element. The invention is based on the following recognition. In DVD+RW, the wobble format consists of the following ADIP units (2 indicating a modulated, i.e., inverted, wobble; 0 indicating a not modulated wobble):

ADIP word sync="2222000000000000000 . . . "
ADIP ZERO="2000002200000000000 . . . "
ADIP ONE="2000220000000000000 . . . "

The first inverted wobble (indicated by "2") is the so-called bit sync. The next three inverted wobbles form the word sync ("222" in case of a word sync, "000" otherwise). The next four wobbles carry the ZERO or ONE information ("0022" or "2200"). After these first 8 wobbles, only positive wobbles follow that carry no information (but that are important for the PLL performance). Apart from the bit sync, there are 3 modulated wobbles for the word sync and only 2 modulated wobbles for the ONE and the ZERO. The Applicants note that the detection of the word sync element is less reliable than the detection of a data bit element, which can be expressed as effective strength. Further, Applicants recognized that for reliable detection of all elements with the minimum disturbance of the regular periodic variations, the same strength for all elements is desirable. The "L"-number indicates the effective strength of the modulated element. For the word sync, it has to be decided whether there is a word sync or not (so compare "222" with "000"), which has an effective strength of 3 wobbles. For the bit detection, we have to decide between ONE and ZERO (so compare "2200" and "0022"), which has an effective strength of L=4 wobbles. To achieve the same strength for the word sync detection and the bit detection, one would have to increase the number of wobbles used for word sync detection by 1, from 3 to 4. Hence, reliable detection in combination with minimal disturbance of the periodic variations is achieved by selecting equal effective strength for the data bit and word sync elements.

BRIEF DESCRIPTION OF THE DRAWINGS

These and other aspects of the invention will be apparent from and elucidated further with reference to the embodiments described, by way of example, in the following description and with reference to the accompanying drawings, in which:

FIG. 1a shows a record carrier with a servo track (top view);

FIG. 1b shows a servo track (cross section);

FIG. 1c shows a wobble of a servo track (detail);

FIG. 1d shows a further wobble of a servo track (detail);

FIG. 4 shows a modulation scheme including split word sync;

In the Figures, elements which correspond to elements already described have the same reference numerals.

DESCRIPTION OF THE PREFERRED EMBODIMENTS

Figure 2:
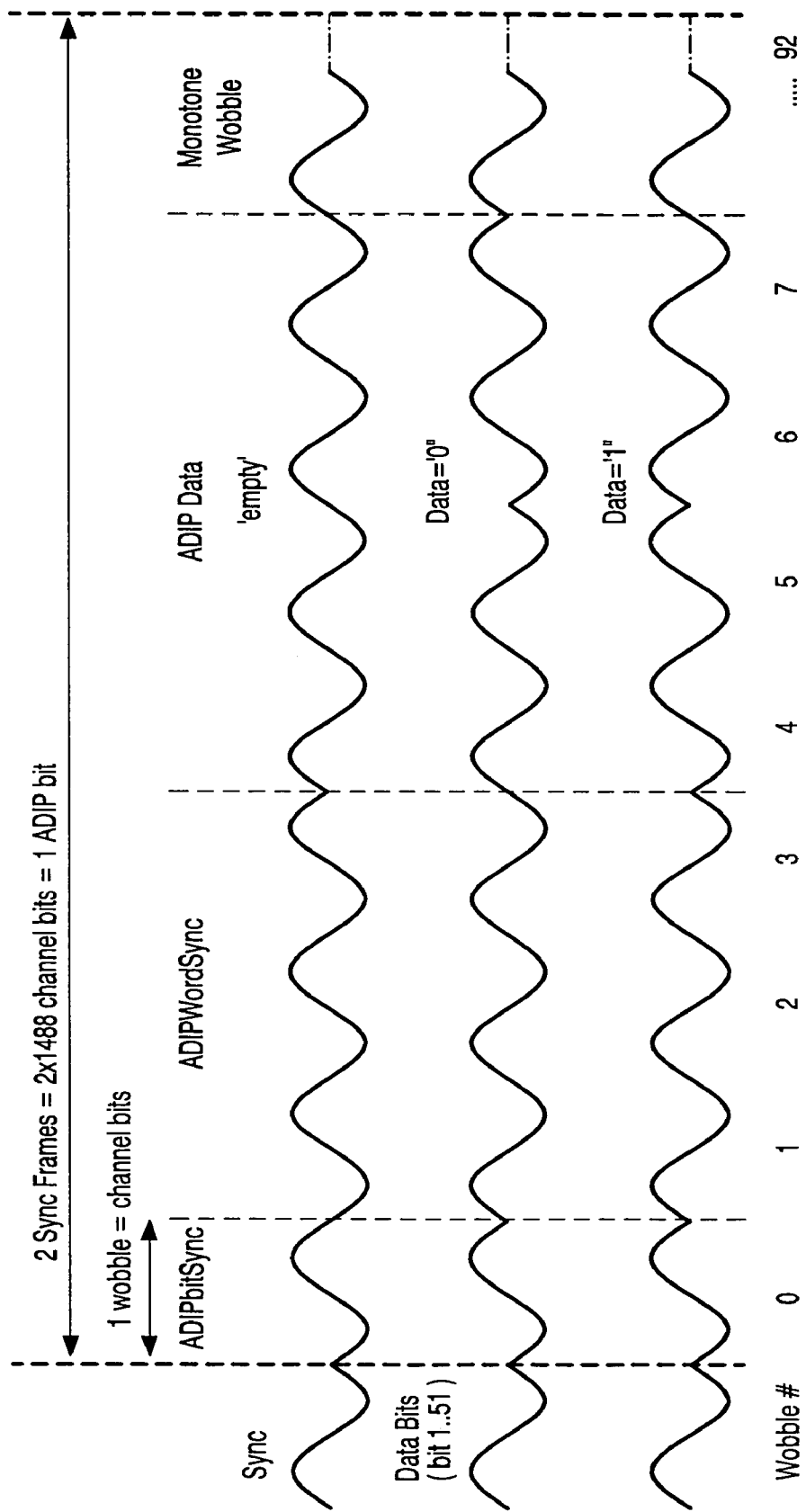
FIG. 2 shows bi-phase wobble modulation.

FIG. 1a shows a disc-shaped record carrier 1 provided with a track 9 intended for recording, and a central hole 10. The track 9 is arranged in accordance with a spiral pattern of windings 3. FIG. 1b is a cross-section taken on the line b-b of the record carrier 1, in which a transparent substrate 5 is provided with a recording layer 6 and a protective layer 7. The recording layer 6 may be optically writable, for example, via phase change, or magneto-optically writable by a device for writing information, such as the known CD-Rewritable or CD-Recordable. The recording layer may also be provided with information via a production process, in which first a master disc is made, and then this master disc is subsequently replicated through pressing. The information is organized in information blocks and is represented by optically readable marks in the form of a succession of areas reflecting much radiation and little radiation such as, for example a succession of pits of different lengths in a CD. In one embodiment, the track 9 on the record carrier of a rewritable type is indicated by a servo-pattern which is provided during manufacture of the blank record carrier. The servo-pattern is formed, for example, by a pre-groove 4 which enables a write head to follow the track 9 during scanning. The pre-groove 4 may be implemented as a deeper or a raised part, or as a material property deviating from its ambience. Alternatively, the servo-pattern may consist of an alternation of elevated and deeper windings, referred to as land and groove patterns, with a transition from land to groove or vice versa taking place per winding. FIGS. 1c and 1d show two examples of a periodical variation of a physical parameter of the pre-groove, called wobble. FIG. 1c shows variation of the lateral position, and FIG. 1d shows variation of the width. This wobble produces a wobble signal in a tracking servo-sensor. The wobble is, for example, frequency-modulated, and position information, such as an address, a time code or winding information, is coded in the modulation. A description of a rewritable CD system which is provided with position information in such a way can be found in U.S. Pat. No. 4,901,300 (PHN 12.398). A servo-pattern may also consist of, for example, regularly distributed sub-patterns which periodically cause tracking signals.

Further, the servo-pattern may include modifications of the land area beside the pre-groove, e.g., an undulating pre-groove having land pre-pits in a specific pattern for encoding position information like in DVD-RW.

The variation of the servo track includes relatively large parts of monotone wobble, so called non-modulated parts. Further, the servo track has relatively short parts where the frequency and/or phase of the wobble deviates from the predetermined wobble frequency, called modulated parts. In this document, any servo-pattern of a periodic nature in combination with any additional elements encoding information is referred to as a servo track having a periodic variation of a physical parameter at a predetermined frequency, or wobble, that has modulated parts.

FIG. 2 shows bi-phase wobble modulation. An upper trace shows the wobble modulation for a word sync pattern, a second and third trace show the wobble modulations for data bits of the address, the total modulation being called Address In Pre-groove (ADIP). Predetermined phase patterns are used for indicating a synchronizing symbol (ADIP bit sync) and a synchronization of the full address word (ADIP word sync), and for the respective data bits (ADIP Data='0', and ADIP data='1'). The ADIP bit sync is indicated by a single inverted wobble (wobble # 0). The ADIP word sync is indicated by three inverted wobbles directly following the ADIP bit sync, whereas data bits have non-inverted wobbles in this area (wobble # 1 to 3). An ADIP Data area comprises a number of wobble periods assigned to represent one data bit, in the Figure, the wobble periods numbered 4 up to 7 (=wobble # 4 to 7). The wobble phase in first half of the ADIP Data area is inverse to the wobble phase in the second half of the area. As such, each bit is represented by two sub-areas having different phases of the wobble, i.e., called bi-phase. Data bits are modulated as follows: ADIP Data='0' is represented by 2 non-inverted wobbles followed by two inverted wobbles, and ADIP data='1' vice versa. In this embodiment, the modulation for data bits is fully symmetrical, giving equal error probability for both data bit values. However, other combinations of wobbles and inverted wobbles, or other phase values may be used. In an embodiment, a predetermined modulation is used after an ADIP Word Sync, indicating 'empty', instead of a data bit. Monotone wobbles may be used after the first data bit, or further data bits may be encoded thereafter. Preferably, a large majority of the wobbles is not modulated (i.e., has the nominal phase) for ensuring an easy lock and a stable output of a PLL in a detector; in this embodiment, the 8 possibly modulated wobbles are followed by 85 not modulated (i.e., monotone) wobbles (wobble # 8 to 92). The output frequency of the PLL has to be as stable as possible, because during writing, the write clock is derived from the PLL output.

Figure 3:
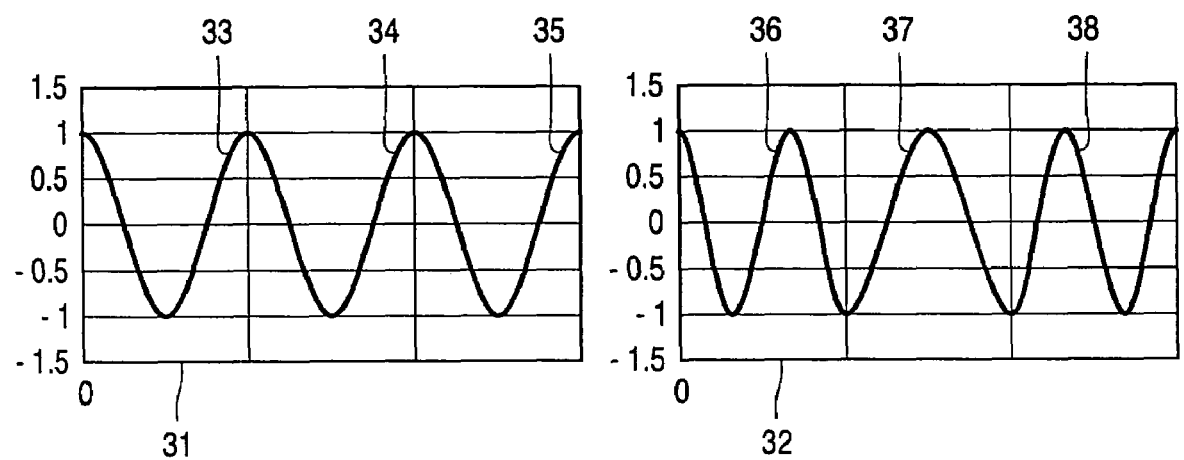
FIG. 3 shows MSK wobble modulation.

FIG. 3 shows Minimum Shift Keying (MSK) wobble modulation. The MSK modulation uses a first pattern 31 for transferring a first bit value and a second pattern 32 for transferring a second bit value. Further combinations of the patterns 31, 32 may be used to transfer synchronization information. Each MSK pattern has a central part of at least one full wobble period, in the first pattern, the central part 34 in non-inverted, while in the second pattern, the central part 37 is inverted. Each MSK pattern further has a starting part and an ending part. The left MSK pattern has a starting part 33 and an ending part 35 just being a single wobble period. The right MSK pattern has a starting part 36, which inverts the phase by having a frequency of 1.5 times the wobble frequency, i.e., by having 3 half sine periods within one wobble frequency period. The ending part is similar to re-invert the phase to the non-inverted state. Detection of MSK data bits is primarily based on the detection of the central part, because both central parts exhibit the maximum difference between the two patterns. In addition, the difference of the not modulated starting part 33 and modulated starting part 36, and the not modulated ending part 35 and modulated ending part 38 can be exploited for detection, the total length of these differences being estimated to have 50% of effective strength of detection when compared to the central part. The MSK encoding can be used to encode address bits in a pre-groove wobble, but the pre-groove wobble needs to be not modulated for the majority of wobble periods. The large majority of not modulated wobbles is needed for reliably controlling the rotation speed of the disc and/or the write clock of the recording process.

Figure 4:
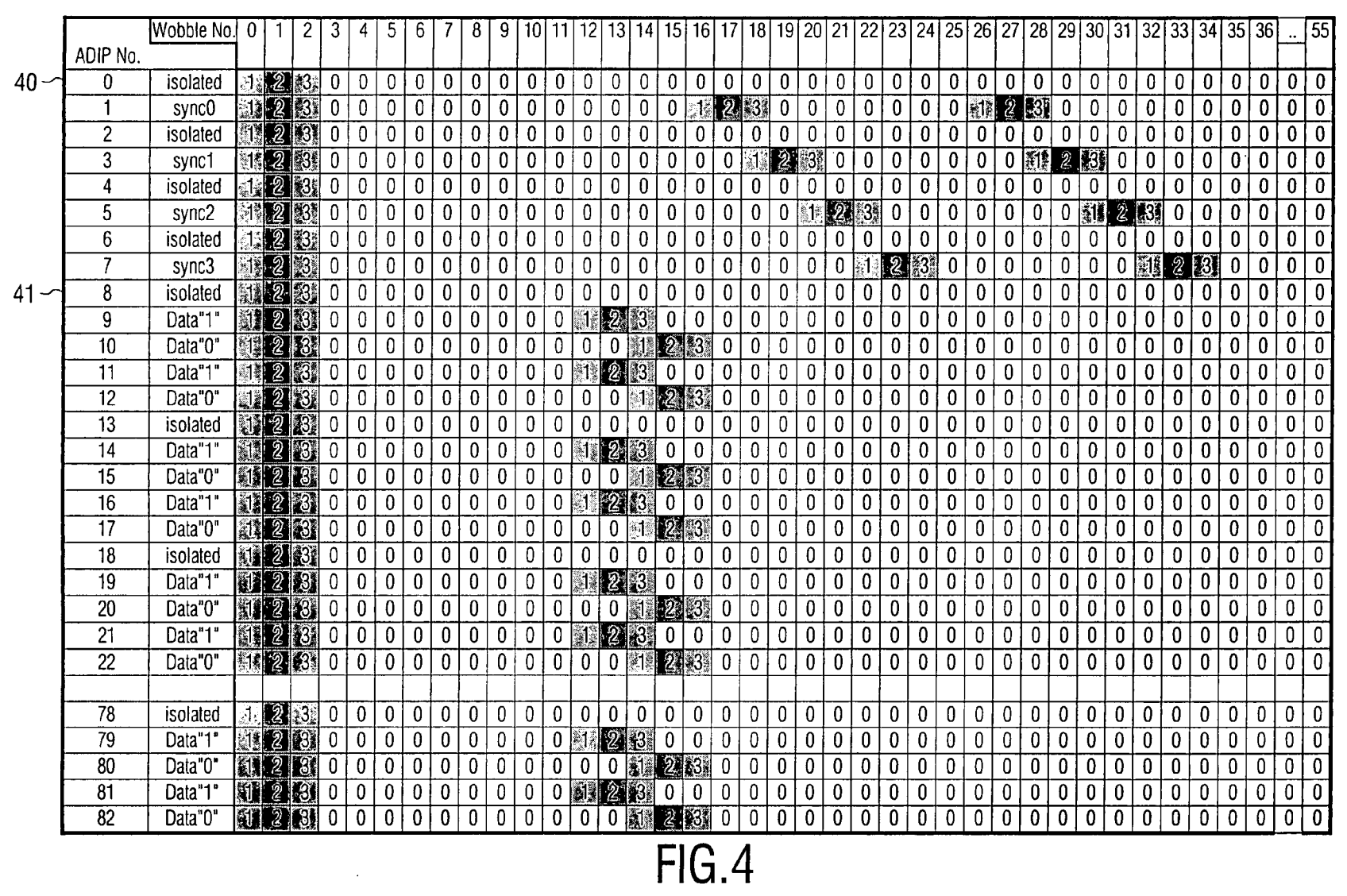

FIG. 4 shows a modulation scheme with split word sync based on the MSK wobble modulation. In each cell of the matrix shown, a zero indicates a not modulated wobble, a one indicates a starting part of 1,5 wobble to invert the phase, a two indicates an inverted wobble, and a three indicates an ending part of 1,5 wobble to re-invert the phase to the normal state, as described above with reference to FIG. 3. In each row of the matrix, 56 consecutive wobbles are indicated (columns 37-54 all being zero), and each row starts with a bit sync element in columns 0,1,2. A total ADIP address word comprises 83 rows, and the rows are numbered according to their ADIP bit number. The ADIP bits numbered 0,2,4,6 and 8,13,18, etc are isolated bit syncs (40,41). The ADIP word includes several word sync elements, which all comprise two partial elements separated by a number of not modulated wobbles. Such sync elements are referred to as split word sync. In ADIP bit 1 there is a first split word sync element called sync0, and in ADIP bits 3,5,7, there are three further split word sync elements sync1, sync2 and sync3. All split word sync elements have a different location for maximum reliability of detection. Starting at ADIP bit 8, there is a repetitive pattern of 5 rows consisting of one isolated bit sync followed by 4 data bits; the values of the data bit elements in the Figure being arbitrary examples. Hence, in total, 13×4=52 data bits are available in the ADIP address word. The effective strength of the MSK modulated elements is indicated by the "L"-number: 2 wobbles for "L=2" marks, even though the modulation extends for 3 wobble periods. As explained above for MSK, the starting and ending parts are considered to have an effective strength of 50%, hence, the total of a central part of 1 wobble and 2 starting/ending wobbles at 50% accumulates to L=2. In an embodiment, the method of detection requires even values, e.g., "L=2" and "L=4", because in that case, the total number of wobbles in an ADIP unit (56) can be divided by the L-value. In constructing the scheme, the following problem is solved:

1. For detection, it is an advantage to have only 1 type of modulated element: so only "L=2" elements or only "L=4" elements. In that case, one only has to build one detector or filter to detect the elements, and not 2 different detectors or filters.
2. To have similar strength of the word sync detection and bit detection, one would need "L=2" elements for bits (ONE or ZERO) and "L=4" elements for word syncs.

The problem is how to balance these 2 requirements. One unsuitable option is to use a single "L=2" element for both the bits and the word syncs. But this means that the word sync is weaker than required, and this will then be the weakest link in the detection scheme. Another unsuitable option is to use a single "L=4" element for both the bits and the word syncs. But this means that the bit detection is unnecessarily strong. This is, of course, no problem for bit detection, but one should keep in mind that these modulated elements disturb the PLL, and using elements that are too long implies unnecessary distortion of the PLL. The solution is to use a single "L=2" element for the bits ONE and ZERO, and 2 "L=2" elements for the word syncs. In this way, the appropriate strengths are given to both bits and word syncs while retaining the advantage of using only a single element, so that only one type of element detecting is required. By using a fixed distance between the 2 "L=2" elements of a word sync, the detection of the word sync is the same as adding the outcome of the detector of a single "L=2" element at 2 points in time, at the distance between these points is fixed.

In an embodiment, the distance between the "L=2" elements of a word sync is fixed at 8 wobble periods, and for the word syncs the following sequences are proposed:

'12300000123000001230000000000000000000000000 00000000000' (sync0)
'12300000001230000012300000000000000000000000 000000000000' (sync1)
'12300000000012300000123000000000000000000000 000000000000' (sync2)
'12300000000000123000001230000000000000000000 000000000000' (sync3), and for the bits the following sequences:
'1230xxxxx00000000000000000000000000000000000 0000000000000' (0 or 1).

The sequence 'xxxxx' is either ZERO or ONE as follows:
ONE: '12300'
ZERO: '00123'

Figure 5:
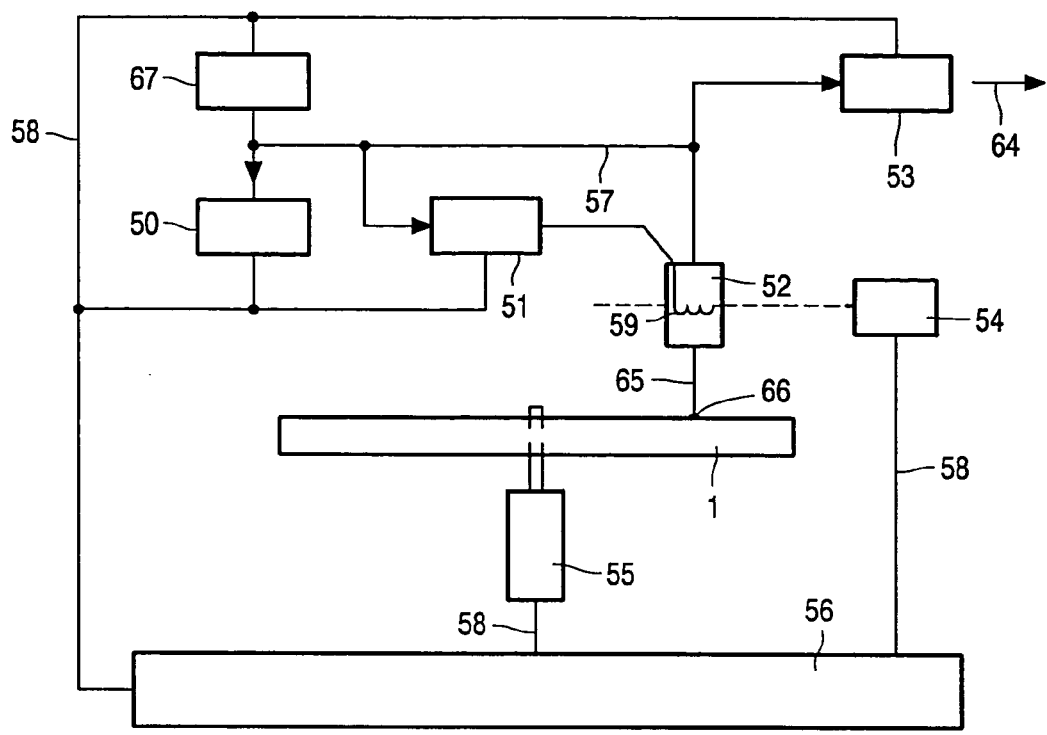
FIG. 5 shows a device for reading information blocks.

FIG. 5 shows a reading device for scanning a record carrier 1. Writing and reading of information on optical discs and formatting, error correcting and channel coding rules, are well-known in the art, e.g., from the CD system. The apparatus of FIG. 5 is arranged for reading the record carrier 1, this record carrier being identical to the record carriers shown in FIG. 1. The device is provided with a read head 52 for scanning the track on the record carrier, and read control means comprising drive unit 55 for rotating the record carrier 1, a read circuit 53, for example, comprising a channel decoder and an error corrector, tracking unit 51 and a system control unit 56. The read head comprises optical elements of the usual type for generating a radiation spot 66 focused on a track of the recording layer of the record carrier via a radiation beam 65 guided through optical elements. The radiation beam 65 is generated by a radiation source, e.g., a laser diode. The read head further comprises a focusing actuator for focusing the radiation beam 65 on the recording layer and a tracking actuator 59 for fine positioning of the spot 66 in radial direction on the center of the track. The apparatus has a positioning unit 54 for coarsely positioning the read head 52 in the radial direction on the track. The tracking actuator 59 may comprise coils for radially moving an optical element, or may be arranged for changing the angle of a reflecting element on a movable part of the read head or on a part on a fixed position in the case part of the optical system is mounted in a fixed position. The radiation reflected by the recording layer is detected by a detector of a usual type, e.g., a four-quadrant diode, for generating a detector signals 57 including a read signal, a tracking error and a focusing error signal. The tracking unit 51 is coupled to the read head for receiving the tracking error signal from the read head and controlling the tracking actuator 59. During reading, the read signal is converted into output information, indicated by arrow 64, in the read circuit 53. The apparatus is provided with a demodulator 50 for detecting and retrieving the address information from the wobble signal included in the detector signals 57 when scanning the servo track of the record carrier. The device is further provided with a system control unit 56 for receiving commands from a controlling computer system or from a user and for controlling the apparatus via control lines 58, e.g., a system bus connected to the drive unit 55, the positioning unit 54, the demodulator 50, the tracking unit 51 and the read circuit 53. To this end, the system control unit comprises control circuitry, for example, a microprocessor, a program memory and control gates, for performing the procedures described below. The system control unit 56 may also be implemented as a state machine in logic circuits. The read device is arranged for reading a disc having tracks having a periodic variation, e.g., a continuous wobble. The read control unit is arranged for detecting the periodic variations and for reading, in dependence thereon, a predetermined amount data from the track. In particular, the demodulator 50 is arranged for reading position information from the modulated signal derived from the modulated wobble. The demodulator 50 has a detection unit for detecting modulated wobbles starting at the bit sync elements in the wobble signal which arrive after a long sequence of non modulated wobbles. The demodulator further has a word detection unit for retrieving the words of address information based on the word sync elements. The beginning of such a word is detected from a word synchronization signal after the bit sync element. The value of a data bit is detected based on the data bit elements encoded by modulated wobbles. Further, the device has a synchronization unit 67 for detecting the word sync elements. In the modulation scheme described above with reference to FIG. 4, word syncs are included that have two modulated partial elements separated by an interval of not modulated periodic variations. The synchronization unit 67 detects the partial elements at the predefined distance, and, from the result, detects the word sync element. In a preferred embodiment, the demodulator 50 and synchronization unit 67 share a filter unit for detecting one single type of modulated element, in particular, in the case that the modulated parts of the data bits have the same structure as the two modulated partial elements of the word sync element.

Figure 6:
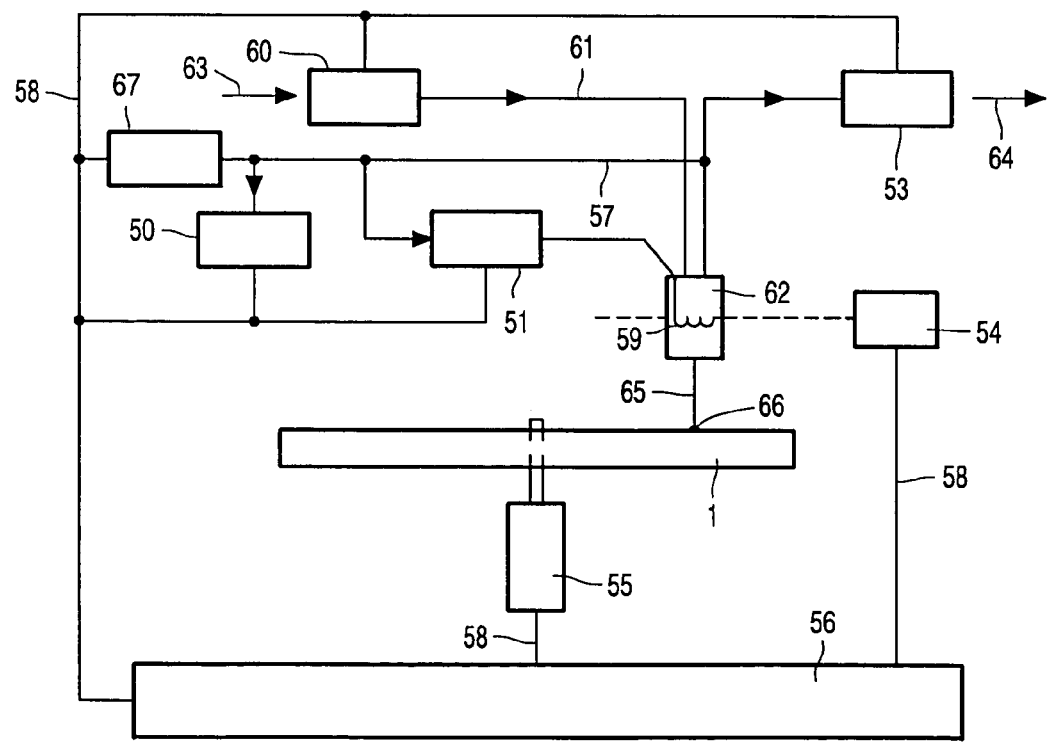
FIG. 6 shows a device for writing information blocks.

FIG. 6 shows a device for writing information on a record carrier, according to the invention, of a type which is (re)writable in, for example, a magneto-optical or optical manner (via phase change or dye) by means of a beam 65 of electromagnetic radiation. The device is also equipped for reading and comprises the same elements as the apparatus for reading described above with FIG. 5, except that it has a write/read head 62 and recording control means which comprises the same elements as the read control means, except for a write circuit 60 that comprises, for example, a formatter, an error encoder and a channel encoder. The write/read head 62 has the same function as the read head 52 together with a write function and is coupled to the write circuit 60. The information presented to the input of the write circuit 60 (indicated by the arrow 63) is distributed over logical and physical sectors according to formatting and encoding rules, and converted into a write signal 61 for the write/read head 62. The system control unit 56 is arranged for controlling the write circuit 60 and for performing the position information recovery and positioning procedure as described above for the reading apparatus. During the writing operation, marks representing the information are formed on the record carrier. The recording control means is arranged for detecting the periodic variations, for example, by locking a phase-locked loop to the periodicity thereof. The demodulator 50 and the synchronization unit 67 are described above with reference to FIG. 5.

Although the invention has been explained by embodiments using a wobble modulation, any other suitable parameter of the track may be modulated, e.g., the track width. Also, for the record carrier, an optical disc has been described, but other media, such as a magnetic disc or tape, may be used. It is noted, that in this document the word 'comprising' does not exclude the presence of other elements or steps than those listed, and the word 'a' or 'an' preceding an element does not exclude the presence of a plurality of such elements, that any reference signs do not limit the scope of the claims, that the invention may be implemented by means of both hardware and software, and that several 'means' may be represented by the same item of hardware. Further, the scope of the invention is not limited to the embodiments, and the invention lies in each and every novel feature or combination of features described above.

The invention claimed is:

1. A record carrier comprising a servo track indicating an information track for recording information blocks represented by marks, said servo track having a periodic variation of a physical parameter at a predetermined frequency, and modulated parts for encoding position information at regular intervals, said modulated parts including a first type starting with a bit sync element and representing a data type having a data bit element, and a second type starting with a bit sync element and representing a word sync type having a word sync element, the word sync element and the data bit element being modulated according to a same predetermined type of modulation of the periodic variation, and the word sync element and the data bit element having equal effective strengths, the effective strength being the number of periodic variations that are substantially different and available for detection of the corresponding element.

2. The record carrier as claimed in claim 1, wherein the word sync element comprises two modulated partial elements separated by an interval of not modulated periodic variations.

3. The record carrier as claimed in claim 2, wherein both partial elements are equal.

4. The record carrier as claimed in claim 1, wherein the data bit element comprises portions of equal length, one portion being a modulated partial element and one portion being not modulated according to a bi-phase modulation.

5. The record carrier as claimed in claim 1, wherein the predetermined type of modulation is minimum shift keying modulation of the periodic variation.

6. A recording and/or playback device comprising:
   means for writing and/or reading information blocks in an information track on a record carrier having a servo track indicating the information track;
   means for causing said writing and/or reading means to scan the servo track; and
   demodulation means, coupled to said writing and/or reading means, for retrieving position information from a signal generated by a variation of a physical parameter of the servo track at a predetermined frequency, said servo track having modulated parts for encoding position information at regular intervals, said modulated parts including a first type starting with a bit sync element and representing a data type having a data bit element, and a second type starting with a bit sync element and representing a word sync type having a word sync element, the word sync element and the data bit element being modulated according to a same predetermined type of modulation of the periodic variation, the demodulation means comprising means for detecting the type of the modulated parts across a same effective strength by detecting the word sync element or the data bit element, the effective strength being the number of periodic variations that are substantially different for the corresponding element.

7. The recording and/or playback device as claimed in claim 6, wherein the means for detecting the type of the modulated parts detects the word sync element from two partial elements that are separated by an interval of not modulated periodic variations.

8. The recording and/or playback device as claimed in claim 6, wherein the means for detecting the type of the modulated parts detects a modulated partial element, the word sync element comprising two of the modulated partial elements separated by an interval of not modulated periodic variations, and/or the data bit element comprising portions of equal length, one portion being the modulated partial element and one portion being not modulated according to a bi-phase modulation.

9. A method of manufacturing a record carrier, in which the record carrier is provided with a servo track indicating an information track intended for recording information blocks, which servo track is provided with a variation of a physical parameter at a predetermined frequency and modulated parts for encoding position information at regular intervals, a first type of modulated parts starting with a bit sync element and being of a data type having a data bit element, and a second type of modulated parts starting with a bit sync element and being of a word sync type having a word sync element, the word sync element and the data bit element being modulated according to a same predetermined type of modulation of the periodic variation, the word sync element and the data bit element having equal effective strengths, the effective strength being the number of periodic variations that are substantially different and available for detection of the corresponding element.

10. The record carrier as claimed in claim 2, wherein the data bit element comprises portions of equal length, one portion being a modulated partial element and one portion being not modulated according to a bi-phase modulation.

11. The record carrier as claimed in claim 2, wherein the predetermined type of modulation is minimum shift keying modulation of the periodic variation.

12. The record carrier as claimed in claim 3, wherein the data bit element comprises portions of equal length, one portion being a modulated partial element and one portion being not modulated according to a bi-phase modulation.

13. The record carrier as claimed in claim 3, wherein the predetermined type of modulation is minimum shift keying modulation of the periodic variation.

14. The recording and/or playback device as claimed in claim 6, wherein the means for detecting the type of the modulated parts detects a modulated partial element, the word sync element comprising two of the modulated partial elements separated by an interval of not modulated periodic variations, and/or the data bit element comprising portions of equal length, one portion being the modulated partial element and one portion being not modulated according to a bi-phase modulation.

* * * * *